(12) United States Patent
Ayabe et al.

(10) Patent No.: US 12,227,182 B2
(45) Date of Patent: Feb. 18, 2025

(54) VEHICLE

(71) Applicant: TOYOTA JIDOSHA KABUSHIKI KAISHA, Toyota (JP)

(72) Inventors: Atsushi Ayabe, Toyota (JP); Akihiro Kitao, Nisshin (JP); Takeshi Yasuda, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 17/951,506

(22) Filed: Sep. 23, 2022

(65) Prior Publication Data

US 2023/0202476 A1 Jun. 29, 2023

(30) Foreign Application Priority Data

Dec. 27, 2021 (JP) .................. 2021-212029

(51) Int. Cl.
*B60W 30/16* (2020.01)
*B60W 10/04* (2006.01)
*B60W 10/18* (2012.01)

(52) U.S. Cl.
CPC ............ *B60W 30/16* (2013.01); *B60W 10/04* (2013.01); *B60W 10/18* (2013.01); *B60W 2520/10* (2013.01); *B60W 2554/4041* (2020.02); *B60W 2554/802* (2020.02); *B60W 2710/18* (2013.01); *B60W 2720/10* (2013.01); *B60W 2754/30* (2020.02)

(58) Field of Classification Search
CPC ...... B60W 30/16; B60W 10/04; B60W 10/18; B60W 2520/10; B60W 2554/4041; B60W 2554/802; B60W 2710/18; B60W 2720/10; B60W 2754/30; B60W 2030/18081; B60W 30/18072; B60W 2520/105; B60W 2540/10; B60W 2540/12; B60W 2710/182; B60W 2720/106; Y02T 10/72

See application file for complete search history.

(56) References Cited

U.S. PATENT DOCUMENTS

| 9,352,747 | B2 * | 5/2016 | Nagatsuka | .............. B60T 8/171 |
| 2006/0100769 | A1 * | 5/2006 | Arai | ..................... B60W 30/16 |
| | | | | 701/96 |
| 2008/0078600 | A1 * | 4/2008 | Inoue | .................... B60W 30/16 |
| | | | | 180/170 |

(Continued)

FOREIGN PATENT DOCUMENTS

JP 2000-219113 A 8/2000

*Primary Examiner* — Mussa A Shaawat
(74) *Attorney, Agent, or Firm* — Dinsmore & Shohl LLP

(57) ABSTRACT

A vehicle includes a power unit configured to output drive power, a brake device, and a controller configured to execute predetermined travel control to control the power unit and the brake device such that the vehicle runs according to an inter-vehicle distance from a preceding vehicle or a difference between a set vehicle speed and an actual vehicle speed. The controller is configured to, when an absolute value of a controlled braking force calculated while the predetermined travel control is being executed is greater than an absolute value of an accelerator-off braking force when an accelerator is off while the predetermined travel control is not being executed, control the brake device with the accelerator-off braking force set for a target braking force on condition that a predetermined condition is satisfied.

4 Claims, 3 Drawing Sheets

(56) References Cited

U.S. PATENT DOCUMENTS

| | | | |
|---|---|---|---|
| 2010/0198477 A1* | 8/2010 | Shirai | B60W 30/09 |
| | | | 701/96 |
| 2016/0221574 A1* | 8/2016 | Ikuta | B60W 30/08 |
| 2017/0327115 A1* | 11/2017 | Tokimasa | B60R 21/00 |
| 2017/0327123 A1* | 11/2017 | Tokimasa | B60R 21/00 |
| 2018/0025643 A1* | 1/2018 | Yamamoto | G08G 1/163 |
| | | | 701/23 |
| 2018/0105168 A1* | 4/2018 | Kozuka | B60T 7/12 |
| 2020/0004267 A1* | 1/2020 | Huang | B60T 17/22 |
| 2021/0094542 A1* | 4/2021 | Horiguchi | B60T 7/042 |
| 2021/0221371 A1* | 7/2021 | Hayashi | B60W 10/06 |
| 2022/0144270 A1* | 5/2022 | Takahama | B60W 10/04 |
| 2023/0078907 A1* | 3/2023 | Oshita | G08G 1/16 |
| | | | 701/96 |
| 2023/0150460 A1* | 5/2023 | Oshita | B60T 7/22 |
| | | | 701/96 |
| 2023/0278559 A1* | 9/2023 | Liu | B60W 30/17 |
| | | | 701/96 |
| 2024/0140465 A1* | 5/2024 | Oshita | B60W 50/14 |

* cited by examiner

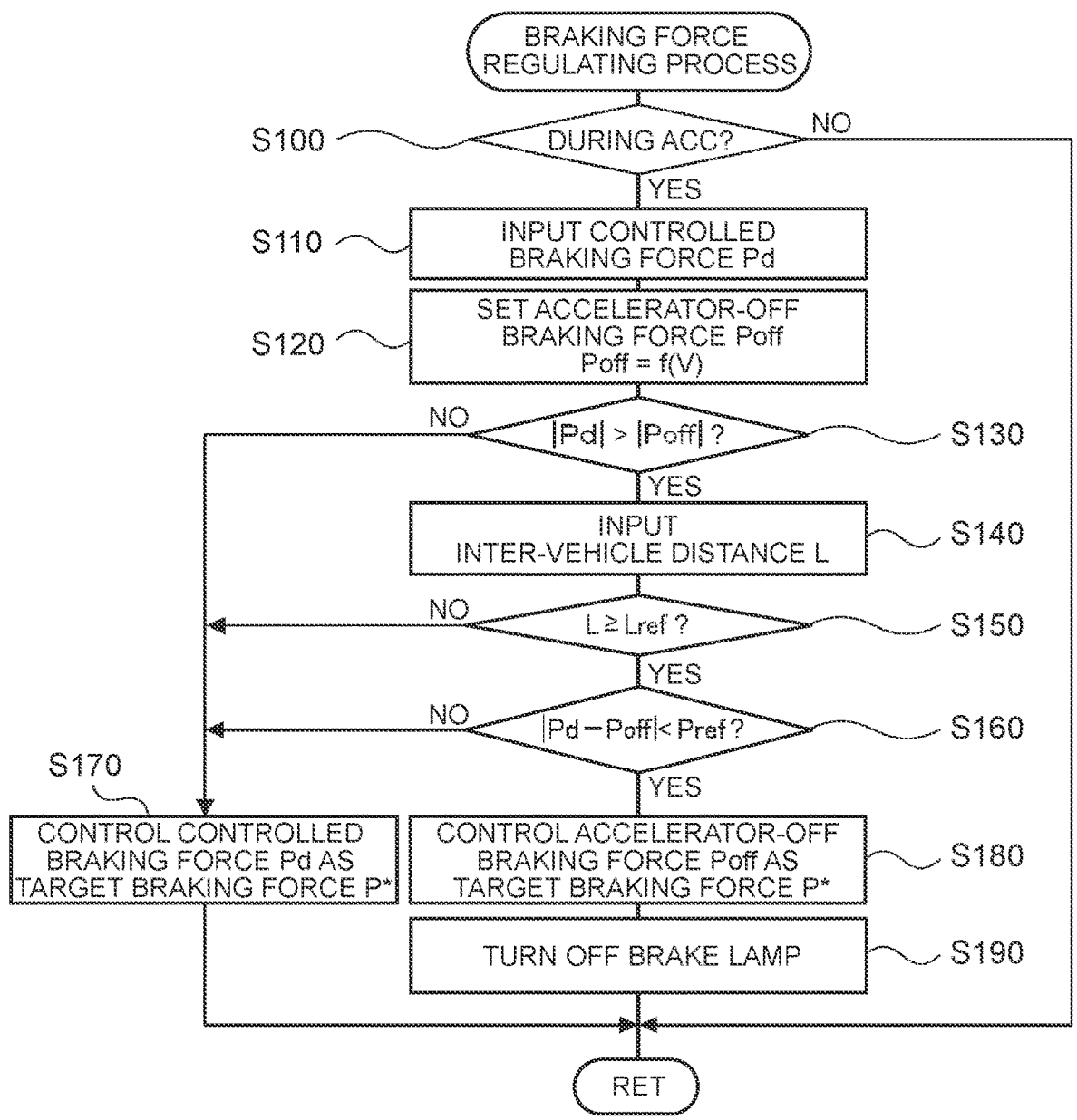
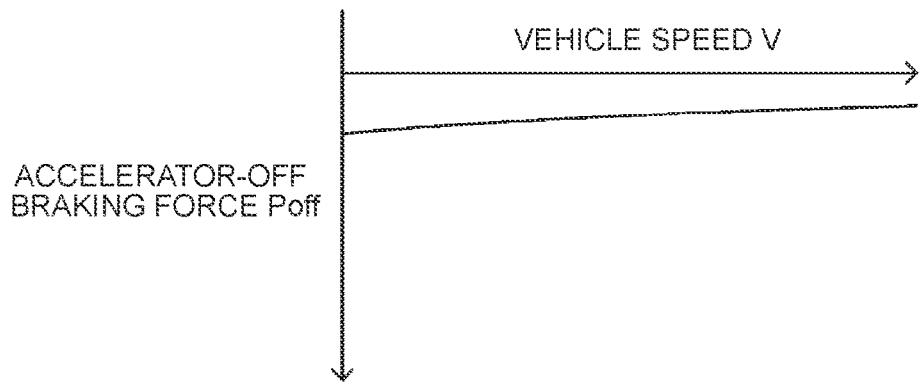

VEHICLE

CROSS-REFERENCE TO RELATED APPLICATION

This application claims priority to Japanese Patent Application No. 2021-212029 filed on Dec. 27, 2021, incorporated herein by reference in its entirety.

BACKGROUND

1. Technical Field

The disclosure relates to a vehicle and, more specifically, to a vehicle that executes predetermined travel control to control a power unit and a brake device such that the vehicle runs according to an inter-vehicle distance from a preceding vehicle and a set vehicle speed.

2. Description of Related Art

There has been suggested a vehicle of this type, which detects an inter-vehicle distance from a preceding vehicle or detects a difference between a set vehicle speed and an actual vehicle speed and regulates braking force generated according to an operation amount of braking and driving operation such that the value of the braking force increases as the inter-vehicle distance from the preceding vehicle reduces and as the difference between the set vehicle speed and the actual vehicle speed reduces (see, for example, Japanese Unexamined Patent Application Publication No. 2000-219113 (JP 2000-219113 A)). With this vehicle, further effective braking force is able to be obtained according to a situation of the vehicle through the control.

SUMMARY

However, with the above vehicle, the braking force is regulated to increase as the inter-vehicle distance from the preceding vehicle reduces and as the difference between the set vehicle speed and the actual vehicle speed reduces, so braking force greater than accelerator-off braking force during normal traveling can be applied. In this case, a driver experiences a feeling of strangeness from braking force more than necessary.

The vehicle according to the disclosure reduces a feeling of strangeness experienced by a driver from braking force when control for causing the vehicle to run according to an inter-vehicle distance from a preceding vehicle or according to a difference between a set vehicle speed and an actual vehicle speed.

Some aspects of the vehicle according to the disclosure are configured as follows.

An aspect of the disclosure relates to a vehicle. The vehicle includes a power unit configured to output drive power, a brake device, and a controller configured to execute predetermined travel control to control the power unit and the brake device such that the vehicle runs according to an inter-vehicle distance from a preceding vehicle or a difference between a set vehicle speed and an actual vehicle speed. The controller is configured to, when an absolute value of a controlled braking force calculated while the predetermined travel control is being executed is greater than an absolute value of an accelerator-off braking force when an accelerator is off while the predetermined travel control is not being executed, control the brake device with the accelerator-off braking force set for a target braking force on condition that a predetermined condition is satisfied.

With the vehicle according to the aspect of the disclosure, when the absolute value of the controlled braking force calculated while the predetermined travel control, to control the power unit and the brake device such that the vehicle runs according to the inter-vehicle distance from the preceding vehicle or the difference between the set vehicle speed and the actual vehicle speed, is being executed is greater than the absolute value of the accelerator-off braking force when the accelerator is off while the predetermined travel control is not being executed, the controller controls the power unit and the brake device with the accelerator-off braking force set for the target braking force on condition that the predetermined condition is satisfied. Thus, when the predetermined condition is satisfied, the power unit and the brake device are controlled with the accelerator-off braking force set for the target braking force, so it is possible to reduce a situation in which a driver experiences a feeling of strangeness as a result of application of braking force more than necessary.

The predetermined condition may be a condition in which the inter-vehicle distance from the preceding vehicle is longer than or equal to a predetermined distance or the difference between the set vehicle speed and the actual vehicle speed is greater than or equal to a predetermined vehicle speed, a condition in which an absolute value of a difference between the controlled braking force and the accelerator-off braking force is less than a predetermined value, or the like. The predetermined condition may include at least one of these conditions. This is based on the fact that, when the inter-vehicle distance from the preceding vehicle is sufficient or when the difference between the controlled braking force and the accelerator-off braking force is small, there is no matter that the power unit and the brake device are controlled with the accelerator-off braking force set for the target braking force and, therefore, the driver does not experience a feeling of strangeness. The accelerator-off braking force may be a braking force based on a vehicle speed or may be a braking force that tends to increase as the vehicle speed increases.

In the vehicle according to the aspect of the disclosure, the controller may be configured to keep a brake lamp off while controlling the power unit and the brake device with the accelerator-off braking force set for the target braking force. With this configuration, it is possible to inform a subsequent vehicle that no brake operation is being performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing an example of a braking force regulating process that is executed by the electronic control unit; and FIG. 4 is a graph illustrating an example of an accelerator-off braking force setting map.

DETAILED DESCRIPTION OF EMBODIMENTS

Figure 1:
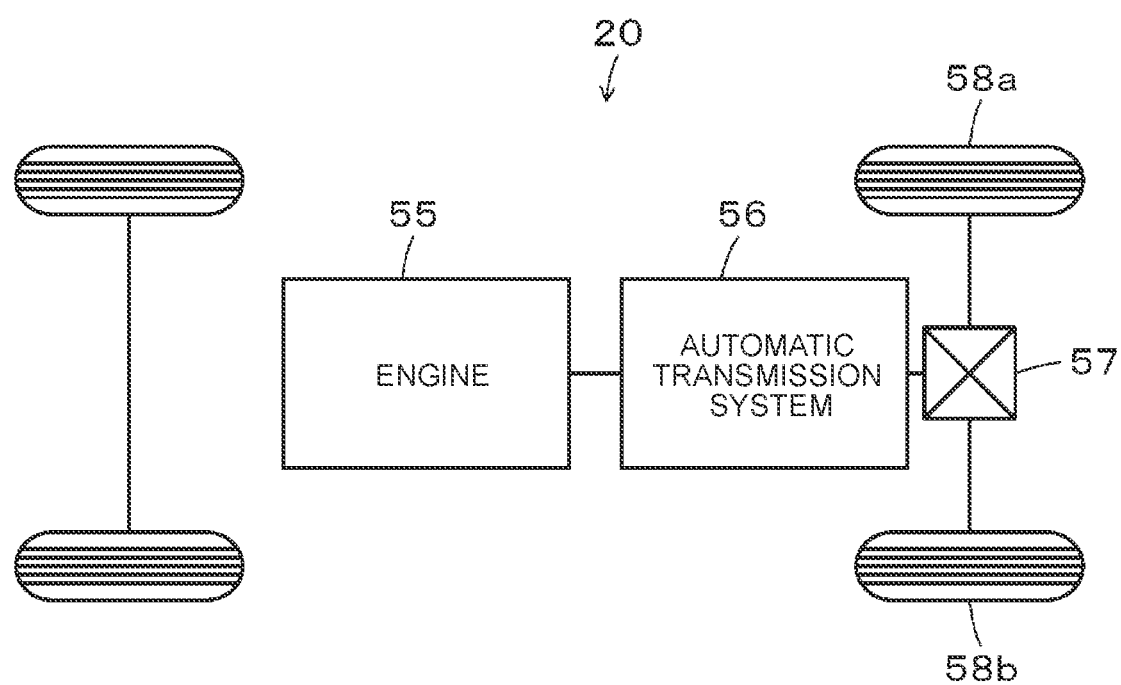
FIG. 1 is a configuration diagram schematically showing the configuration of a vehicle according to an embodiment of the disclosure.
Figure 2:
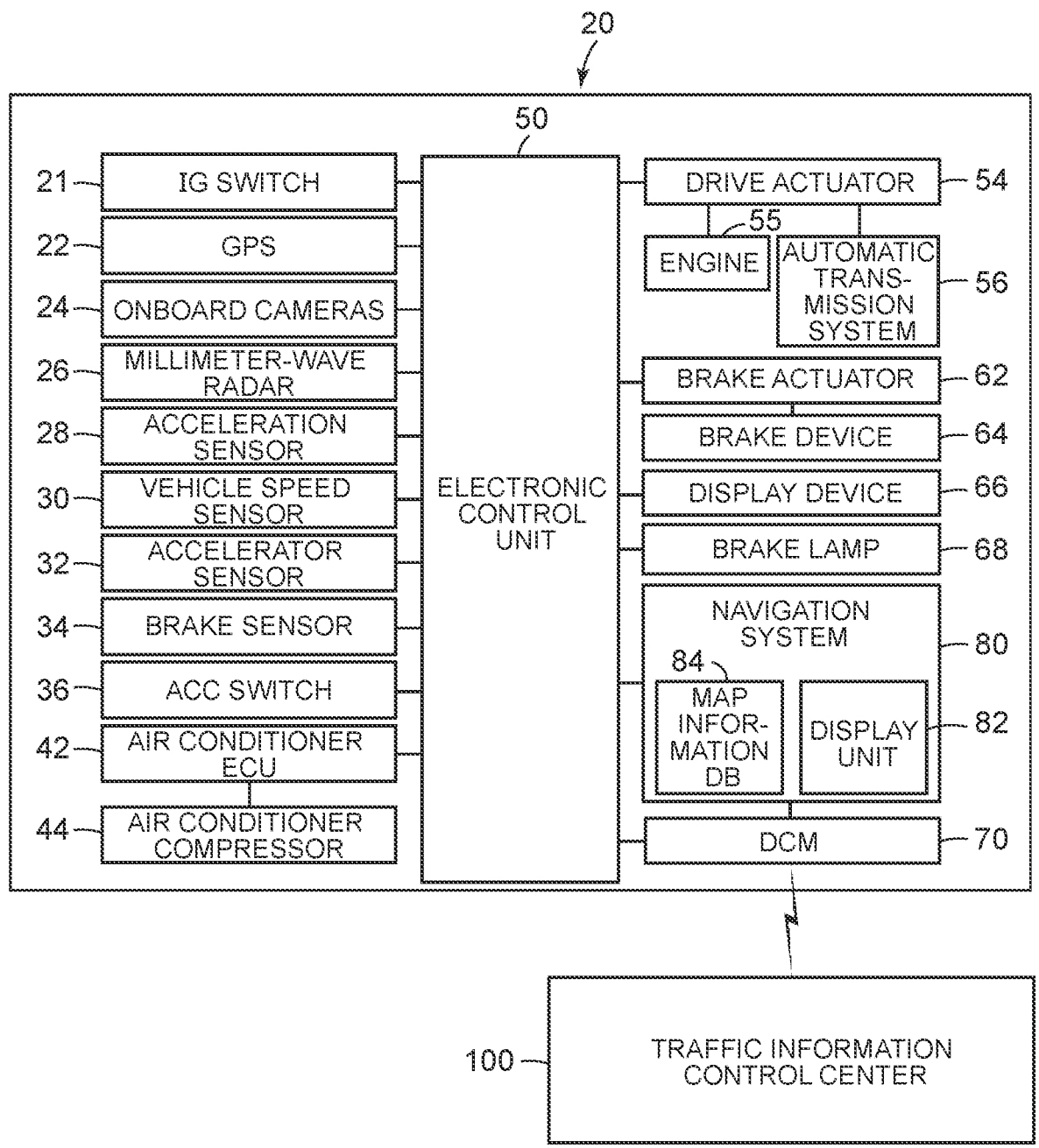
FIG. 2 is a block diagram showing an example of the configuration of the vehicle according to the embodiment as blocks mainly including an electronic control unit.

An embodiment of the disclosure will be described. FIG. 1 is a configuration diagram schematically showing the configuration of a vehicle 20 according to the embodiment of the disclosure. FIG. 2 is a block diagram showing an example of the configuration of the vehicle 20 according to the embodiment as blocks mainly including an electronic control unit 50. As shown in the drawing, the vehicle 20 according to the embodiment includes an engine 55 serving as a power source, an automatic transmission system 56 that shifts power from the engine 55 and outputs the power, and a drive actuator 54 for driving the engine 55 and the automatic transmission system 56.

The engine 55 may be a multi-cylinder (for example, four-cylinder or six-cylinder) internal combustion engine that is driven by using hydrocarbon fuel, such as gasoline.

The automatic transmission system 56 is made up of a torque converter with a lockup clutch, and an automatic transmission. The automatic transmission provides forward multi-stage, such as four-stage, five-stage, and six-stage, speed shifts by using hydraulic drive and a reverse one-stage speed shift. The output shaft of the automatic transmission system 56 is connected to drive wheels 58a, 58b via a differential gear 57.

The drive actuator 54 changes the shift stage M of the automatic transmission system 56 in accordance with a target shift stage M* set by the electronic control unit 50, and executes intake air volume control, fuel injection control, ignition control, intake valve open-close timing control, and the like such that the engine 55 is operated at a target operation point.

The vehicle 20 according to the embodiment includes an ignition switch 21, a global positioning system (global positioning satellite (GPS)) 22, onboard cameras 24, a millimeter-wave radar 26, an acceleration sensor 28, a vehicle speed sensor 30, an accelerator sensor 32, a brake sensor 34, an ACC switch 36, an air conditioner electronic control unit (hereinafter, referred to as air conditioner ECU) 42, an air conditioner compressor 44, an electronic control unit 50, a brake actuator 62, a brake device 64, a display device 66, a brake lamp 68, a data communication module (DCM) 70, a navigation system 80, and the like in addition to the engine 55, the automatic transmission system 56, and the drive actuator 54.

The GPS 22 is a device that detects the location of the vehicle based on signals transmitted from a plurality of GPS satellites. The onboard cameras 24 are cameras that capture the image of an area around the vehicle, and, for example, a forward camera that captures the image of an area ahead of the vehicle, a rear camera that captures an area behind the vehicle, and the like correspond to the onboard cameras 24. The millimeter-wave radar 26 detects an inter-vehicle distance or a relative velocity between a host vehicle and a preceding vehicle and detects an inter-vehicle distance and a relative velocity between the host vehicle and a following vehicle.

The acceleration sensor 28 is, for example, a sensor that detects the acceleration of the vehicle in a front and rear direction and that detects the acceleration of the vehicle in a right and left direction. The vehicle speed sensor 30 detects the speed V of the vehicle based on wheel speeds or the like. The accelerator sensor 32 detects an accelerator operation amount or the like according to the depression amount of an accelerator pedal by a driver. The brake sensor 34 detects a brake position or the like as the depression amount of a brake pedal by the driver.

The ACC switch 36, for example, turns on or off adaptive cruise control (hereinafter, referred to as "ACC"), sets a set vehicle speed V*, and sets an inter-vehicle distance L*. In ACC, the engine 55 and the brake device 64 are controlled such that the vehicle runs at a set vehicle speed V when there is no preceding vehicle within a predetermined distance, and the engine 55 and the brake device 64 are controlled such that the vehicle runs following a preceding vehicle with a set inter-vehicle distance L* when there is the preceding vehicle within the predetermined distance.

Although not shown in the drawing, the air conditioner ECU 42 is a microcomputer that mainly includes a CPU and that, in addition to the CPU, further includes a ROM, a RAM, a flash memory, an input port, an output port, a communication port, and the like. The air conditioner ECU 42 is incorporated in the air conditioner that air-conditions a passenger compartment and controls the drive of the air conditioner compressor 44 in the air conditioner such that the temperature of the passenger compartment becomes a set temperature.

Although not shown in the drawing, the electronic control unit 50 is a microcomputer that mainly includes a CPU and that, in addition to the CPU, further includes a ROM, a RAM, a flash memory, an input port, an output port, a communication port, and the like. The electronic control unit 50 sets a target operation point (target rotation speed and target torque) of the engine 55 and a target shift stage M* of the automatic transmission system 56 based on the accelerator operation amount from the accelerator sensor 32, the brake position from the brake sensor 34, and the like.

The electronic control unit 50 sets a required driving force and a required power based on the accelerator operation amount from the accelerator sensor 32 and the vehicle speed V from the vehicle speed sensor 30, sets the target shift stage M* of the automatic transmission system 56 and the required driving force based on the vehicle speed V and the required driving force, sets the target operation point of the engine 55 such that the engine outputs the required driving force and the required power to the vehicle, and transmits the target shift stage M* and the target operation point to the drive actuator 54. When the brake pedal is depressed, the electronic control unit 50 sets a controlled braking force Pd based on the brake position from the brake sensor 34 and the vehicle speed V from the vehicle speed sensor 30 and basically transmits the controlled braking force Pd to the brake actuator 62 as a target braking force.

The electronic control unit 50 executes ACC when the ACC switch 36 is turned on. In ACC, when there is no preceding vehicle within a predetermined distance, the target shift stage M* and the target operation point are transmitted to the drive actuator 54 to control the engine 55 and the brake device 64 such that the vehicle runs at a set vehicle speed V* set by the ACC switch 36, and are also transmitted to the brake actuator 62 as a target braking force. When there is a preceding vehicle within the predetermined distance, the target shift stage M* and the target operation point are transmitted to the drive actuator 54 to control the engine 55 and the brake device 64 such that the vehicle runs following the preceding vehicle according to an inter-vehicle distance or a difference in vehicle speed between a set vehicle speed and an actual vehicle speed, set by the ACC switch 36, within the range of the set vehicle speed V* set by the ACC switch 36 and are transmitted to the brake actuator 62 as the target braking force.

The brake actuator 62 controls the brake device 64 such that the target braking force set by the electronic control unit 50 is applied to the vehicle by the brake device 64. The brake device 64 is, configured as, for example, a hydraulically-driven friction brake.

The display device 66 is incorporated in, for example, an instrument panel in front of a driver seat and displays various pieces of information. The brake lamp 68 turns on when depression of the brake pedal is detected by the brake sensor 34 or when the target braking force is greater than or equal to a predetermined value.

The data communication module (DCM) 70 transmits information on the host vehicle to the traffic information control center 100 and receives road traffic information from the traffic information control center 100. Examples of the information on the host vehicle include the location of the host vehicle, vehicle speed V, fuel efficiency, drive power, and drive mode. Examples of the road traffic information include information on current or future traffic congestion, information on a current average vehicle speed or a predicted future average vehicle speed in a section on a travel route, information on traffic regulation, information on weather, information on a road surface condition, and information on a map. The DCM 70 communicates with the traffic information control center 100 at predetermined intervals (for example, every 30 seconds, every minute, every two minutes, or the like).

The navigation system 80 is a system that guides the host vehicle to a set destination and that includes a display unit 82 and a map information database 84. The navigation system 80 communicates with the traffic information control center 100 via the data communication module (DCM) 70. When a destination is set, the navigation system 80 sets a route based on information on the destination, information on the current location (the current location of the host vehicle) acquired by the GPS 22, and the map information database 84. The navigation system 80 acquires road traffic information by communicating with the traffic information control center 100 at predetermined time intervals (for example, every three minutes, every five minutes, or the like), and performs route guidance based on the road traffic information.

The operation of the thus configured vehicle 20, particularly, the operation at the time when the vehicle decelerates while ACC is being executed by turning on the ACC switch 36, will be described. FIG. 3 is a flowchart showing an example of a braking force regulating process that is executed by the electronic control unit 50. The process is repeatedly executed at intervals of a predetermined period.

When the braking force regulating process is executed, the electronic control unit 50 initially determines whether ACC is being executed (step S100). When ACC is not being executed, the electronic control unit 50 determines that regulating a braking force is not needed, and ends the process.

When the electronic control unit 50 determines in step S100 that ACC is being executed, the electronic control unit 50 inputs the controlled braking force Pd (step S110); whereas the electronic control unit 50 sets a braking force (accelerator-off braking force) Poff when the accelerator is off while ACC is not being executed (step S120). The electronic control unit 50 sets the controlled braking force Pd based on the brake position from the brake sensor 34 and the vehicle speed V from the vehicle speed sensor 30 when the brake pedal is depressed. During execution of ACC, the electronic control unit 50 sets the controlled braking force Pd based on an inter-vehicle distance L from a preceding vehicle, obtained by a signal from the millimeter-wave radar 26, a set vehicle speed V* set by the ACC switch 36, a vehicle speed V from the vehicle speed sensor 30, and the like. In the embodiment, since ACC is being executed, it is assumed that the electronic control unit 50 inputs the controlled braking force Pd set based on an inter-vehicle distance L from a preceding vehicle, a set vehicle speed V*, a vehicle speed V, and the like. In the embodiment, it is assumed that the relationship between vehicle speed V and accelerator-off braking force Poff is determined in advance by an experiment or the like and is stored as an accelerator-off braking force setting map, and the accelerator-off braking force Poff is set by deriving an associated accelerator-off braking force Poff from the map when the vehicle speed V is given. An example of the accelerator-off braking force setting map is shown in FIG. 4.

Subsequently, the electronic control unit 50 determines whether the absolute value of the controlled braking force Pd is greater than the absolute value of the accelerator-off braking force Poff (step S130). When the absolute value of the controlled braking force Pd is less than or equal to the absolute value of the accelerator-off braking force Poff, the electronic control unit 50 determines that regulating a braking force is not needed, controls the brake device 64 by transmitting the controlled braking force Pd to the brake actuator 62 as the target braking force P* (step S170), and ends the process.

When the electronic control unit 50 determines in step S130 that the absolute value of the controlled braking force Pd is greater than the absolute value of the accelerator-off braking force Poff, the electronic control unit 50 inputs the inter-vehicle distance L from the preceding vehicle (step S140). The electronic control unit 50 determines whether the inter-vehicle distance L from the predetermined distance is longer than or equal to a predetermined distance Lref (step S150). The electronic control unit 50 determines whether the absolute value of the difference between the controlled braking force Pd and the accelerator-off braking force Poff is less than a threshold Pref (step S160). The predetermined distance Lref may be a distance to such an extent that a slight deceleration is performed by turning off the accelerator during normal running and then the brake is operated slowly. Therefore, the predetermined distance Lref extends as the vehicle speed V increases. In the embodiment, the relationship between vehicle speed V and predetermined distance Lref is stored as the predetermined distance setting map, and the predetermined distance Lref according to the vehicle speed V is derived and used. The threshold Pref is used such that the difference between the controlled braking force Pd and the accelerator-off braking force Poff does not increase, and a braking force at the time when the brake pedal is lightly depressed may be used. In step S150, the electronic control unit 50 may not only determine whether the inter-vehicle distance L from the preceding vehicle is longer than or equal to the predetermined distance Lref but also determine whether the difference between the set vehicle speed and the actual vehicle speed V is greater than or equal to a predetermined vehicle speed. In this case, when the electronic control unit 50 determines that the inter-vehicle distance L from the preceding vehicle is longer than or equal to the predetermined distance Lref or when the electronic control unit 50 determines that the difference between the set vehicle speed and the actual vehicle speed V is greater than or equal to the predetermined vehicle speed, the electronic control unit 50 may make affirmative determination.

When the electronic control unit 50 determines in step S150 that the inter-vehicle distance L from the preceding vehicle is shorter than the predetermined distance Lref or when the electronic control unit 50 determines that the inter-vehicle distance L from the preceding vehicle is longer than or equal to the predetermined distance Lref but when the electronic control unit 50 determines in step S160 that the absolute value of the difference between the controlled braking force Pd and the accelerator-off braking force Poff is greater than or equal to the threshold Pref, the electronic control unit 50 controls the brake device 64 by transmitting the controlled braking force Pd to the brake actuator 62 as the target braking force P* (step S170), and ends the process. Thus, ACC is able to be further properly executed.

When the electronic control unit 50 determines in step S150 that the inter-vehicle distance L from the preceding vehicle is longer than or equal to the predetermined distance Lref and the electronic control unit 50 determines in step S160 that the absolute value of the difference between the controlled braking force Pd and the accelerator-off braking force Poff is less than the threshold Pref, the electronic control unit 50 determines that a large braking force is not needed, controls the brake device 64 by transmitting the accelerator-off braking force Poff to the brake actuator 62 as the target braking force P* (step S180), turns off the brake lamp 68 (step S190), and ends the process. Thus, since the accelerator-off braking force Poff acts on the vehicle, it is possible to suppress a situation in which the driver experiences a feeling of strangeness due to an excessive braking force. Since the brake lamp 68 is turned off, it is possible to inform a following vehicle that no brake operation is being performed.

In the vehicle 20 according to the above-described embodiment, when the absolute value of the controlled braking force Pd set by ACC while ACC is being executed is greater than the absolute value of the accelerator-off braking force Poff, the brake device is controlled by using the accelerator-off braking force Poff as the target braking force P* when the condition in which the inter-vehicle distance L from the preceding vehicle is longer than or equal to the predetermined distance Lref and the condition in which the absolute value of the difference between the controlled braking force Pd and the accelerator-off braking force Poff is less than the threshold Pref are satisfied. Thus, it is possible to suppress a situation in which the driver experiences a feeling of strangeness due to an excessive braking force. When the brake device is controlled by using the accelerator-off braking force Poff as the target braking force P*, the brake lamp 68 is turned off. Thus, it is possible to inform a following vehicle that no brake operation is being performed.

In the vehicle 20 according to the embodiment, when the absolute value of the controlled braking force Pd set by ACC while ACC is being executed is greater than the absolute value of the accelerator-off braking force Poff, the brake device is controlled by using the accelerator-off braking force Poff as the target braking force P* when the condition in which the inter-vehicle distance L from the preceding vehicle is longer than or equal to the predetermined distance Lref and the condition in which the absolute value of the difference between the controlled braking force Pd and the accelerator-off braking force Poff is less than the threshold Pref are satisfied. However, even when only one of the condition in which the inter-vehicle distance L from the preceding vehicle is loner than or equal to the predetermined distance Lref and the condition in which the absolute value of the difference between the controlled braking force Pd and the accelerator-off braking force Poff is less than the threshold Pref is satisfied, the brake device may be controlled by using the accelerator-off braking force Poff as the target braking force P*. However, when the condition in which the inter-vehicle distance L from the preceding vehicle is longer than or equal to the predetermined distance Lref and the condition in which the absolute value of the difference between the controlled braking force Pd and the accelerator-off braking force Poff is less than the threshold Pref are satisfied and additionally another condition is satisfied, the brake device may be controlled by using the accelerator-off braking force Poff as the target braking force P*.

In the vehicle 20 according to the embodiment, the braking force while ACC is being executed is regulated. Alternatively, the braking force while autonomous driving is being performed instead of execution of ACC may be regulated.

In the embodiment, the disclosure is applied to the vehicle 20 including the engine 55. Alternatively, the disclosure may be applied to a hybrid electric vehicle that includes a motor capable of outputting drive power in addition to the engine, or the disclosure may be applied to a battery electric vehicle.

The correspondence relation between major elements of the embodiment and major elements of the disclosure described in Summary will be described. In the embodiment, the engine 55 may be regarded as the "power unit", the brake device 64 may be regarded as the "brake device", and the electronic control unit 50 may be regarded as the "controller".

The correspondence relation between major elements of the embodiment and major elements of the disclosure described in Summary does not limit the elements of the disclosure described in the Summary since the embodiment is an example for specifically describing the aspects of the disclosure described in the Summary. In other words, the aspect of the disclosure described in the Summary should be interpreted based on the description therein, and the embodiment is only a specific example of the aspect of the disclosure described in the Summary.

The embodiment of the disclosure is described above; however, the disclosure is not limited to the embodiment and may be, of course, modified into various forms without departing from the scope of the disclosure.

The disclosure is usable in the industry of manufacturing vehicles.

What is claimed is:

1. A vehicle comprising:
    a power unit configured to output drive power;
    a brake device; and
    an electronic control unit configured to execute predetermined travel control to control the power unit and the brake device such that the vehicle runs according to an inter-vehicle distance from a preceding vehicle or a difference between a set vehicle speed and an actual vehicle speed, wherein the electronic control unit is configured to, when an absolute value of a controlled braking force calculated while the predetermined travel control is being executed is greater than an absolute value of an accelerator-off braking force when an accelerator is off while the predetermined travel control is not being executed, control the brake device with the accelerator-off braking force set for a target braking force on condition that a predetermined condition is satisfied.

2. The vehicle according to claim 1, wherein the predetermined condition is at least one of a condition in which the inter-vehicle distance from the preceding vehicle is longer than or equal to a predetermined distance or the difference between the set vehicle speed and the actual vehicle speed is greater than or equal to a predetermined vehicle speed and a condition in which an absolute value of a difference between the controlled braking force and the accelerator-off braking force is less than a predetermined value.

3. The vehicle according to claim 1, wherein the accelerator-off braking force is a braking force based on a vehicle speed.

4. The vehicle according to claim 1, wherein the electronic control unit is configured to keep a brake lamp off while controlling the power unit and the brake device with the accelerator-off braking force set for the target braking force.

* * * * *